United States Patent [19]

Ikumi

[11] Patent Number: 5,268,854

[45] Date of Patent: Dec. 7, 1993

[54] MICROPROCESSOR WITH A FUNCTION FOR THREE-DIMENSIONAL GRAPHIC PROCESSING

[75] Inventor: Nobuyuki Ikumi, Tokyo, Japan

[73] Assignee: Kabushiki Kaisha Toshiba, Kawasaki, Japan

[21] Appl. No.: 16,678

[22] Filed: Feb. 12, 1993

Related U.S. Application Data

[63] Continuation of Ser. No. 791,128, Nov. 13, 1991, abandoned.

[30] Foreign Application Priority Data

Nov. 13, 1990 [JP] Japan .................. 2-306450

[51] Int. Cl.[5] .............................. G06F 7/38
[52] U.S. Cl. ........................ 364/736; 364/748
[58] Field of Search ....................... 364/736, 748

[56] References Cited

U.S. PATENT DOCUMENTS

| | | | |
|---|---|---|---|
| 4,476,537 | 10/1984 | Blau et al. | 364/748 |
| 4,612,628 | 9/1986 | Beauchamp et al. | 364/748 |
| 4,766,564 | 8/1988 | DeGroot | 364/748 |
| 4,800,516 | 1/1989 | Si et al. | 364/748 |
| 4,961,162 | 10/1990 | Nguyenphu et al. | 364/748 |

FOREIGN PATENT DOCUMENTS 380099 8/1990 European Pat. Off. .

OTHER PUBLICATIONS

Nikkei Electronics, (No. 470), Apr. 3, 1989, pp. 199–209.

Primary Examiner—Tan V. Mai
Attorney, Agent, or Firm—Foley & Lardner

[57] ABSTRACT

A microprocessor includes an integer processing unit with the decimal point fixed; first and second floating point processing units which can execute simultaneously with the integer processing unit; a register file; a first fixed point processing unit for receiving data at the point n from the register file, for searching for data at the point n+1 by partitioned addition of the increment forwarding by one point, and for outputting the searched data; a second fixed point processing unit for receiving data at the point n from the register file, for searching for data at the point n+2 by partitioned addition of the increment forwarding by two points, and for outputting the searched data; and a merger for receiving the addition results and for gathering data of the bit length of each upper half.

3 Claims, 7 Drawing Sheets

MICROPROCESSOR WITH A FUNCTION FOR THREE-DIMENSIONAL GRAPHIC PROCESSING

This application is a continuation of application Ser. No. 07/791,128, filed Nov. 13, 1991, now abandoned.

BACKGROUND OF THE INVENTION

The present invention relates to a microprocessor, especially to one suitable for three-dimensional graphic processing.

There are several kinds of three-dimensional graphic processings. For example, in glow shading processing, interpolation calculation is carried out. FIG. 7 shows the variation of the bit number of data used in this calculation. Assuming that data showing brightness in the point n is $I_n$, a brightness $I_{n+1}$ in the point n+1 is obtained by adding the increment $\Delta I$ between these points to $I_n$.

This applies also to the case of hidden surface processing. Hidden surface processing is processing to cancel surfaces invisible from a certain viewing point, and data Z indicating a depth of each point are then used. Also regarding the depth Z, the increment $\Delta Z$ is added to the value $Z_n$ indicating the depth at the point n so that the depth $Z_{n+1}$ can be obtained.

Here, data of the brightness $I_n$ or the depth $Z_n$ are expressed by an integer. But operations are carried out with a double accuracy fixed decimal point with a length of 64 bits in total, having e.g., a fraction part of 32 bits length being the same as the integer so that cumulative errors may not occur at the time of addition. As the ultimate results after addition, only 32 bits of the integer part among 64 bits are taken and written into a memory.

When color processing is carried out, information of each of the colors of red (R), green (G) and blue (B) is expressed by an integer having a length of 8 bits generally as shown in FIG. 8. But, since double accuracy is necessary to carry out the interpolation calculation as described above, each requires 2×16 bits, that is, 48 bits are required as a whole. After the addition, the integer parts each having a length of 8 bits are extracted individually and stored in the memory.

As a microprocessor carrying out three-dimensional graphic processings in the prior art, there is, for example, the microprocessor 80860 disclosed in Nikkei Electronics, Apr. 3, 1989 (No. 470) pp. 199-209. This microprocessor has an integer processing unit (hereinafter referred to as "IPU") at an integer processing section, a floating point processing unit (hereinafter referred to as "FPU") at a floating point processing section, and a register file (hereinafter referred to as "RF") at each of the processing sections.

The register file of the integer processing section has 32 bits, and the register file of the floating point processing section has 64 bits. For color processing requiring 48 bits, the register file of the integer processing section has an insufficient bit number and therefore the register file of the floating point processing section of 64 bits is used. Consequently, in order to make such a microprocessor have the three-dimensional processing function, an arithmetic device for carrying out addition or the like at the FPU side takes the form of holding the register file jointly between the FPU and the arithmetic device.

FIG. 9 shows the constitution of a microprocessor at an FPU side in the prior art. The microprocessor has an FPU1 92 and an FPU2 93 as FPUs, and a three-dimensional processing unit (hereinafter referred to as "3D unit") 94. These three arithmetic devices have an RF 91 jointly. The RF 91 is provided with source ports S1 and S2 for reading data, and a destination port D for writing data, which are connected to the FPU1 92, the FPU2 93 and the 3D unit 94 respectively. In this case, each of the three ports has 64 bits.

Constitution of the 3D unit 94 among these units is shown in FIG. 10. The input end of a pipeline register 101 for temporarily storing data read out from the source ports S1 and S2 is connected to these ports, and the input end of a partitioned length adder 102 for receiving the stored data and for adding them is connected to an output end of the pipeline register 101. The output end of the partitioned length adder 102 is connected to an input end of a temporary register 105 for temporarily storing the addition results and an input end of a selector (hereinafter referred to as "SEL") 103 respectively. The output end of the temporary register 105 is connected to the input end of a shifter 106 for receiving the stored data and data given from a merge register and for shifting the data in sequence. The output end of the shifter 106 is connected to an input end of a merge register 107 for collecting and consolidating different data into one data. The output end of the merge register 107 is connected to an input end of the shifter 106 and an input end of the SEL 103, and an output end of the SEL 103 is connected to a pipeline register 104. The output end of the pipeline register 104 is connected to the destination port D of the RF 91.

The 3D unit 94 operates as follows. Each data $R_n$, $G_n$ and $B_n$ of 64 bits at the point n being read out from the source ports S1 and S2 of the RF 91 are once stored to the pipeline register 101, and then given to the partitioned length adder 102. At the partitioned length adder 102, the increment $\Delta$ of each color is added to the data $R_n$, $G_n$ and $B_n$ respectively, and data $R_{n+1}$, $G_{n+1}$ and $B_{n+1}$ of 64 bits at the point n+1 are obtained and supplied to the temporary register 105 and the SEL 103. In this case, the increment $\Delta$ corresponds to the difference of data between the point n and the point n+1, divided by the number of lattice points to be plotted between the two points.

The SEL 103 changes the output from the merge register 107 and the output from the partitioned length adder 102, and in this case the changing is effected so that the output from the partitioned length adder 102 is outputted to the pipeline register 104. The outputted data at the point n+1 are once stored in the pipeline register 104, and then written into the RF 91 from the destination port D.

The data at the point n+1 outputted from the partitioned length adder 102 are stored once in the temporary register 105, and then given to the shifter 106. The data of 32 bits of the integer part among the data of 64 bits are taken out by the shifter 106, and supplied to the merge register 107.

In the merge register 107, the data $R_{n-1}$, $G_{n-1}$ and $B_{n-1}$ at the point n-1 obtained by the last-before addition and the data $R_n$, $G_n$ and $B_n$ at the point n obtained by the last addition are stored as one data in the consolidated form respectively as shown in FIG. 11(a). As 32 bits are sufficient for the data of one picture element, the last operation result and the present operation result are stored in combined form.

The data $R_{n-1}$, $G_{n-1}$ and $B_{n-1}$ at the point n-1 are removed by the shifter 106, and the data $R_n$, $G_n$ and $B_n$ at the point n are shifted to the positions where the above data were stored as shown in FIG. 11(b), and the data $R_{n+1}$, $G_{n+1}$ and $B_{n+1}$ at the point n+1 obtained by the present addition are stored in the positions where the data at the point n existed. The data at the point n and the point n+1 combined in this way are once stored in the merge register 107 and outputted to the SEL 103, and stored in the pipeline register 104 and then outputted to the RF 91. The data stored in the RF 91 are outputted to a memory (not shown).

However, the microprocessor in the prior art has problems the following. In order that the data of two picture elements at the point n and the point n+1 are received and stored in the memory (not shown), every time the data for one picture element are obtained, they must be stored once in the RF 91. For the above, three cycles, that is, the cycle for carrying out addition to obtain data of the point n and for storing data of the point n in the RF 91, the cycle for carrying out addition to obtain data of the point n+1, and the cycle for storing the obtained data of the point n and the point n+1 in the memory are necessary, which hinders high speed processing.

Also in three-dimensional graphical processing, in addition to the above-mentioned glow shading processing and the hidden surface processing, a processing named texture mapping exists. This is a processing to affix a certain diagram indicated by a two-dimensional plane to a surface of a three-dimensional body. In this case, a processing of coordinate transformation or the like is necessary to project the two-dimensional diagram on the surface of the three-dimensional body. The color of the surface of the three-dimensional body becomes ultimately the combination of color of the body itself and color of the diagram being affixed. Therefore the product of data of each color (R, G, B) for each picture element must be searched.

However, the floating point processing section of the microprocessor in the prior art is not provided with the integer multiplication function, and multiplication must be carried out in the integer processing section. If the multiplication of data of 32 bits is carried out by using the Booth algorithm, in the integer processing section, about 11 cycles are needed. Further, data showing three colors (R, G, B) at a certain point cannot be obtained by multiplication once in the processing in the prior art. It is necessary to carry out the peak processing in that multiplication for each color individually and store results once in three registers, and the three multiplication results obtained are then merged to one data and stored in one register. Since several cycles are required additionally for the above pack processing itself, the total cycles become not less than 33 cycles, thereby requiring an enormous time.

SUMMARY OF THE INVENTION

Accordingly, an object of the present invention is to provide a microprocessor capable of achieving an improvement in the processing speed.

According to the present invention, a microprocessor is provided which comprises an integer processing unit having the position of its decimal point fixed; first and second floating point processing units capable of execution simultaneously with the integer processing unit; a register file connected to the first and second floating point processing units; a first fixed point processing unit installed on the side of the first floating point processing unit for receiving data at the point n (n is an integer not less than 0) from the register file, for searching for data at the point n+1 by partitioned addition of the increment forwarding by one point, and for outputting the searched data as the first addition results; a second fixed point processing unit installed on the side of the second floating point processing unit for receiving data at the point n from the register file, for searching for data at the point n+2 by partitioned addition of the increment forwarding by two points, for outputting the searched data as the second addition results, and for storing them in the register file; and a merger for receiving the first addition results and the second addition results being outputted, and for gathering data of the bit length of each upper half and outputting them as one data.

At the first fixed point processing unit, data at the point n and the increment forwarding by one point are added in partitioned addition, thereby searching for data at the point n+1, and at the second fixed point processing unit, data at the point n and the increment forwarding by two points are added in partitioned addition, thereby searching for data at the point n+2. The data at the point n+1 and the data at the point n+2 are given to the merger, and data of the bit length of each upper half are collected and outputted as one data. When there is only one fixed point processing unit, it is necessary that addition processing be carried out to search for data at the point n+1 forwarding by one point and the addition results are stored in the register, and using the data at the point n+1 as the addition results, addition processing is carried out to search for data at the point n+1, and the data at the point n and the data at the point n+1 are outputted. Time is therefore required for the processing. However, according to a microprocessor of the present invention, since data at the point n+1 and data at the point n+2 can be obtained simultaneously, the processing speed becomes rapid.

Also when the partitioned multiplication function is not provided on the side of the floating point processing unit, multiplication must be carried out individually on the side of the integer processing unit to search for each data, and therefore the processing speed is lowered. However, when at least one among the first and second fixed point processing units can carry out the partitioned multiplication, the partitioned multiplication is carried out on the side of the floating point processing unit, and a plurality of data to be accommodated within the partition bit length at the same time, and therefore the processing speed is improved.

When the first fixed point processing unit has first and second pipeline registers and a first partition length multiplier, and the second fixed point processing unit has third and fourth pipeline registers, a second partition length multiplier and a merger, the operation is as follows. In the first fixed point processing unit, data outputted from the register file are held at the first pipeline register and then given to the first partition length multiplier, and the partition multiplication is carried out and the first multiplication results are outputted. In the second fixed point processing unit, data outputted from the register file are held at the third pipeline register and then given to the second partition length multiplier, and the partition multiplication is carried out and the second multiplication results are outputted. The first and second multiplication results are given to the merger, and respective integer parts are extracted and then united as one data and outputted. The data outputted from the merger are held at the fourth pipeline register, and then outputted and supplied to the register file. Accordingly, partition multiplication is possible in the first and second floating point processing units respectively, and from the obtained multiplication results of the two units, the integer parts are taken out respectively and united as one data and searched for at the same time, to thereby improve the processing speed.

BRIEF DESCRIPTION OF THE DRAWINGS

In the attached drawings.

DESCRIPTION OF THE PREFERRED EMBODIMENTS

Figure 1:
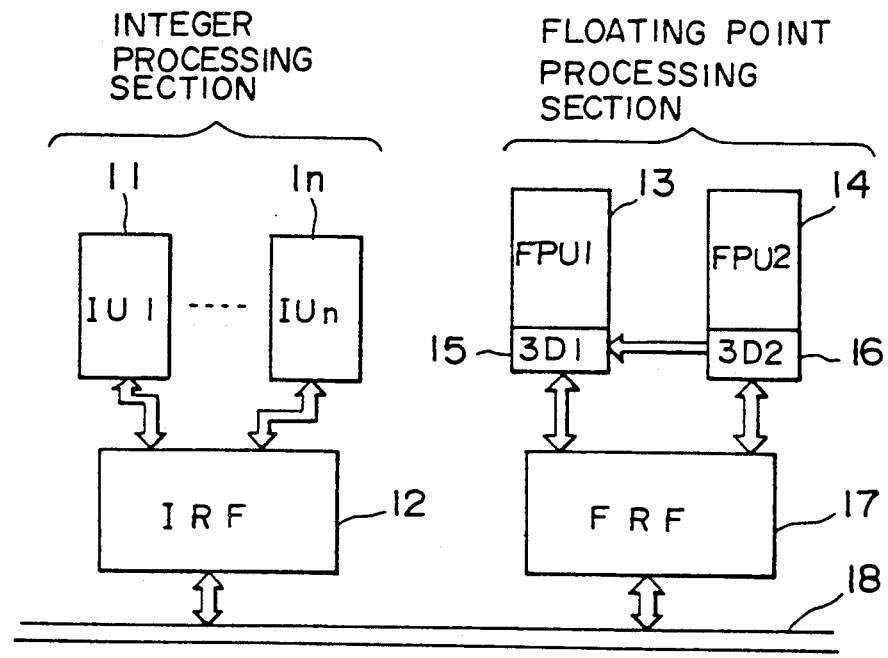
FIG. 1 is a block diagram showing a constitution of a microprocessor according to an embodiment of the invention.

An embodiment of the present invention will be described by referring to the accompanying drawings as follows. FIG. 1 shows in outline a configuration of a microprocessor of a first embodiment. An integer processing section is provided with n pieces of IU1-11-IUn 1n as integer processing units, which are connected to an integer register file (hereinafter referred to as "IRF") 12 for the integer processing section through exclusive ports. In the IU1 11-IUn 1n, operations are carried out using integer data being stored in the IRF 12 and operation results are stored in the IRF 12, and the stored operation results are transmitted through a data line 18 to devices such as memories (not shown).

Also, a floating point processing section is provided with two floating point units FPU1 13 and FPU2 14, which are connected to a floating point register file (hereinafter referred to as "FRF") 17 for the floating point processing section through exclusive ports. Also the FRF 17 is connected through the data line 18 to devices such as memories (not shown) like the IRF 12. The FRU1 13 is provided with a 3D unit1 15 corresponding to the first fixed point processing unit, and the FPU2 14 is provided with a 3D unit2 16 corresponding to the second fixed point processing unit.

Figure 2:
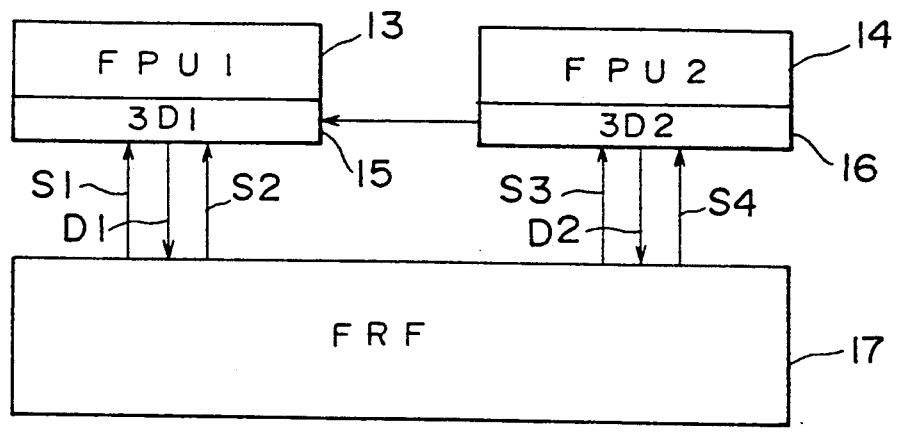
FIG. 2 is a block diagram showing a constitution of a floating point processing section of the microprocessor.

FIG. 2 shows the connection relationship of each element in the floating point processing section. The FRF 17 as operand has two sets, that is, sources S1, S2 and a destination D1, as well as sources S3 and S4 and a destination D2. Among these, the 3D unit1 15 has the sources S1, S2 and the destination D1 for common use with the FPU1 13. Also the 3D unit2 16 has the sources S3, S4 and the destination D2 for common use with the FPU2 14. For this reason, in relation between the 3D unit1 15 and the 3D unit2 16, data transfer can be carried out simultaneously between the above units and the FRF 17, but in relation between the 3D unit1 15 and the FPU1 13 or between the 3D unit2 16 and the FPU2 14, data transfer cannot be carried out simultaneously with the FRF 17.

Figure 3:
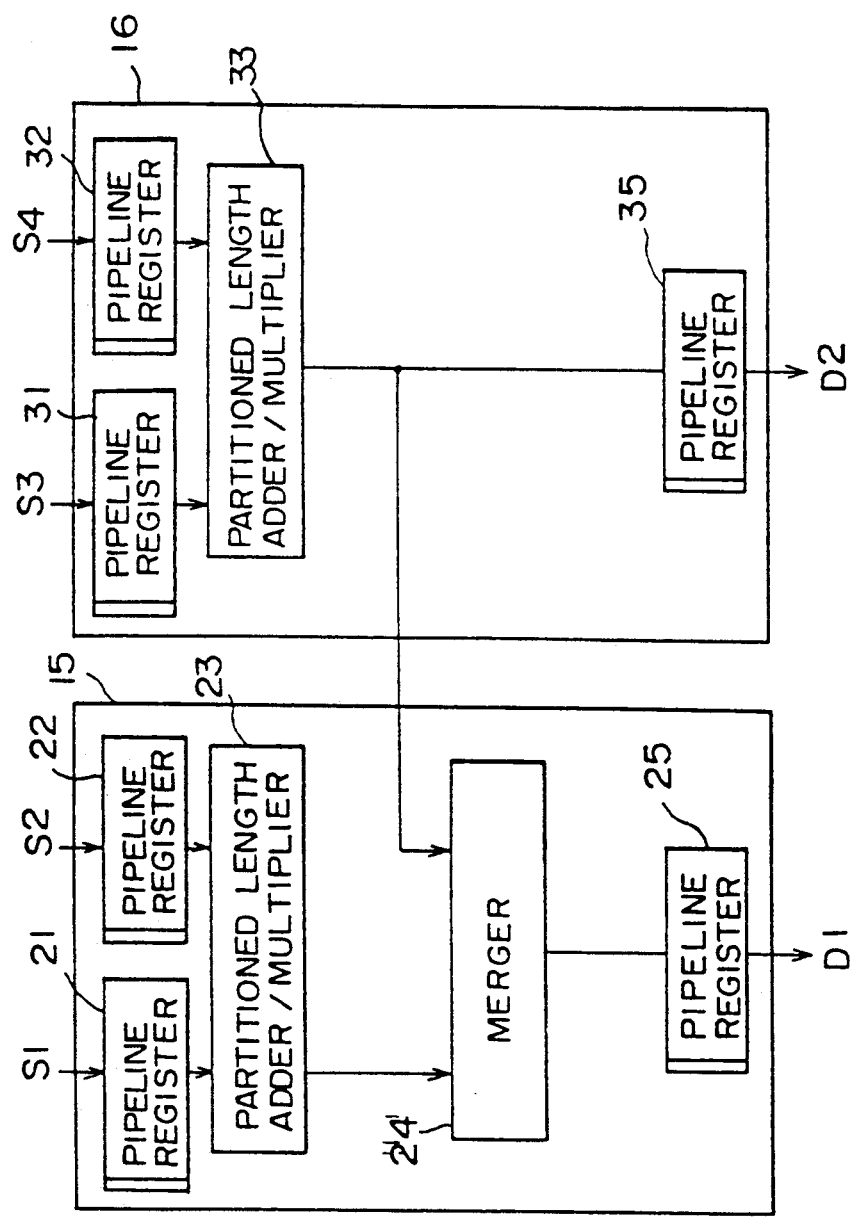
FIG. 3 is a block diagram showing an internal constitution of a 3D unit.

The internal constitutions of the 3D unit1 15 and the 3D unit2 16 are as shown in FIG. 3. The 3D unit1 15 has the pipeline registers 21, 22 and 25, a partition length adding and multiplying device 23, and a merger 24, and the 3D unit2 16 has pipeline registers 31, 32 and 35, and a partition length adding and multiplying device 33.

In the 3D unit1 15, the input end of the pipeline register 21 is connected to the source S1, and the input end of the pipeline register 22 is connected to the source S2. The output ends of the pipeline registers 21 and 22 are connected to the input end of the partition length adding and multiplying device 23. The output end of the partition length adding and multiplying device 23 is connected to one input end of the merger 24, and the output end of the partition length adding and multiplying device 33 is connected to other input end of the merger 24. The output end of the merger 24 is connected to input end of the pipeline register 25, and output end of the pipeline register 25 is connected to the destination D1 of the FRF 17.

In the 3D unit2 16, the input end of the pipeline register 31 is connected to the source S3, and the input end of the pipeline register 32 is connected to the source S4. The output ends of the pipeline registers 31 and 32 are connected to the input end of the partitioned length adding and multiplying device 33 respectively. The output end of the partition length adding and multiplying device 33 is connected to the merger 24 of the 3D unit1 15 as above described, and is further connected to the pipeline register 35 within the 3D unit2 16. The output end of the pipeline register 35 is connected to the destination D2 of the FRF 17.

Figure 4:
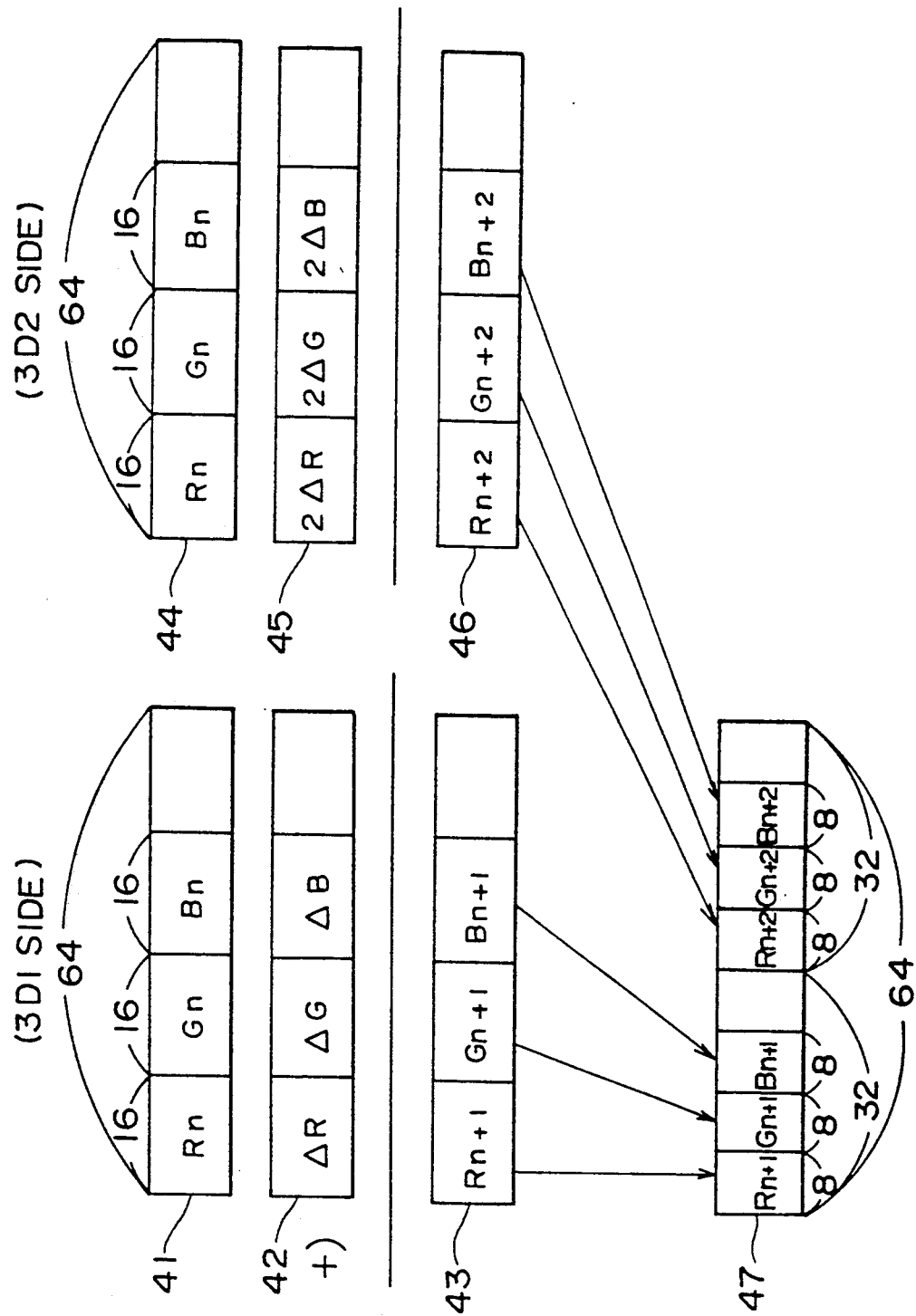
FIG. 4 is an explanation diagram showing a processing sequence and the number of bits in the case of carrying out the interpolation calculus of color information within the 3D unit.

The 3D unit1 15 has the partitioned length adding and multiplying device 23, and the 3D unit2 16 has the partitioned length adding and multiplying device 33 respectively. In these partitioned length adding and multiplying devices 23, 33, operations in the case of carrying out interpolation calculation for color information will be described referring to FIG. 4. The color information is expressed as an integer data having 8 bits respectively for each color (R, G, B), and data for the fixed decimal point of every 16 bits including fraction parts are used in the interpolation calculation.

At the partitioned length adding and multiplying device 23 of the 3D unit1 15, the increments ($\Delta R$, $\Delta G$, $\Delta B$) 42 forwarding by one point are added to the data ($R_n$, $G_n$, $B_n$) 41 at the point n, thereby data ($R_{n+1}$, $G_{n+1}$, $B_{n+1}$) 43 at the point n+1 are obtained. At the partitioned length adding and multiplying device 33 of the 3D unit2 16, the increments ($2\Delta R$, $2\Delta G$, $2\Delta B$) 45 forwarding by two points are added to the data ($R_n$, $G_n$, $B_n$) 44 at the point n, thereby data ($R_{n+2}$, $G_{n+2}$, $B_{n+2}$) at the point n+2 are obtained.

The data ($R_{n+1}$, $G_{n+1}$, $B_{n+1}$) 43 at the point n+1 obtained from the partitioned length adding and multiplying device 23 and the data ($R_{n+2}$, $G_{n+2}$, $B_{n+2}$) 46 at the point n+2 obtained from the partitioned length adding and multiplying device 33 are inputted to the merger 24. At the merger 24, integer parts of 8 bits are extracted from respective data, and are stored as unified one data ($R_{n+1}$, $G_{n+1}$, $B_{n+1}$, $R_{n+2}$, $G_{n+2}$, $B_{n+2}$) 47. The data 47 to be obtained are stored from the pipeline register 25 through the destination D1 in the FRF 17. Also the data ($R_{n+2}$, $G_{n+2}$, $B_{n+2}$) 46 of every 16 bits including fraction parts at the point n+2 are once stored in the pipeline register 35 so as to be used in the next operation, and then are stored through the destination D2 to the FRF 17.

Next, the data ($R_{n+2}$, $G_{n+2}$, $B_{n+2}$) at the point n+2 stored in the FRF 17 are read out through the sources S1 and S2, and inputted to the partitioned length adding and multiplying devices 23 and 33. At the partitioned length adding and multiplying device 23, the increments ($\Delta R$, $\Delta G$, $\Delta B$) forwarding by one point are added to the data ($R_{n+2}$, $G_{n+2}$, $B_{n+2}$) 46 at the point n+2, thereby data ($R_{n+3}$, $G_{n+3}$, $B_{n+3}$) at the point n+3 are obtained. At the partitioned length adding and multiplying device 33, the increments ($2\Delta R$, $2\Delta G$, $2\Delta B$) forwarding by two points are added to the data ($R_{n+2}$, $G_{n+2}$, $B_{n+2}$) 46 at the point n+2 thereby data ($R_{n+4}$, $G_{n+4}$, $B_{n+4}$) at the point n+4 are obtained. These two data are inputted to the merger 24, and integer parts are taken out and are stored as united one data ($R_{n+3}$, $G_{n+3}$, $B_{n+3}$, $R_{n+4}$, $G_{n+4}$, $B_{n+4}$). These data are outputted through the pipeline register 25 to the FRF 17, and the data ($R_{n+4}$, $G_{n+4}$, $B_{n+4}$) at the point n+4 are outputted to the FRF 17 and stored. Such processings are repeated and so forth, thereby color information at the two points can be obtained simultaneously.

Figure 5:
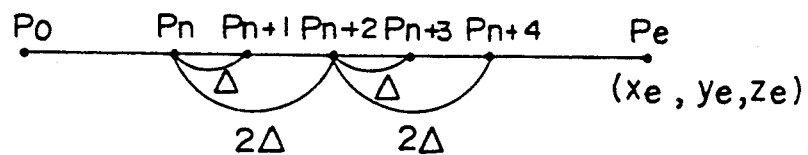
FIG. 5 is an explanation diagram showing interpolation calculus of the depth from the point P0 to the point Pe for hidden surface processing.

Procedures in processings to search for the color information have been shown, and similar processings are carried out also in the case of searching for depth at each point necessary for hidden surface processing. For example, as shown in FIG. 5, increments $\Delta$ forwarding by one point are added to data $P_n$ ($x_n$, $y_n$, $z_n$) indicating the depth in the xyz direction at the point n thereby data $P_{n+1}$ ($x_{n+1}$, $y_{n+1}$, $z_{n+1}$) at the point n+1 are obtained, and also increments $2\Delta$ forwarding by two points are added thereto, thereby data $P_{n+2}$ ($x_{n+2}$, $y_{n+2}$, $z_{n+2}$) at the point n+2 are obtained. The operation processings are carried out from data $P_0$ ($x_0$, $y_0$, $z_0$) at the point $P_0$ to data $P_e$ ($x_e$, $y_e$, $z_e$) at the point $P_e$.

Figure 10:
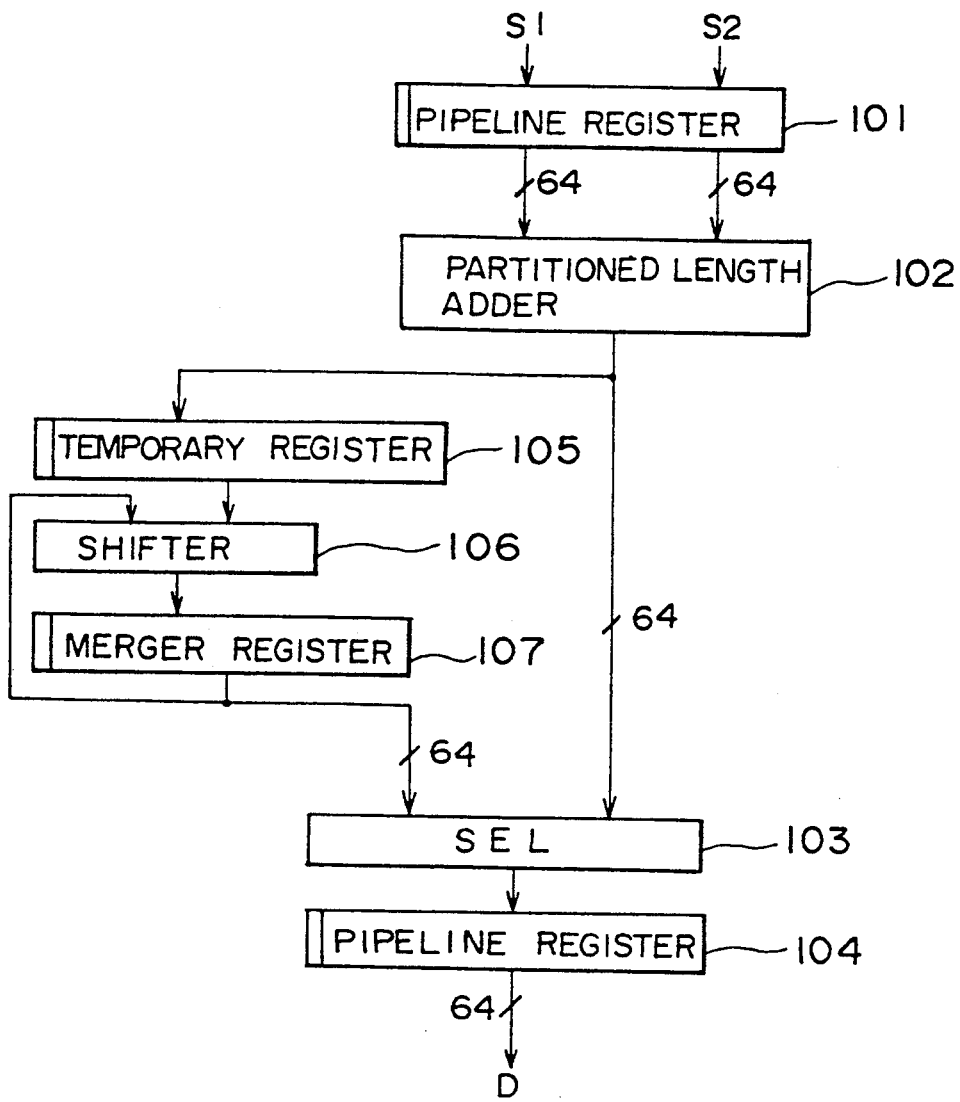
FIG. 10 is a block diagram showing the internal constitution of a 3D unit of the microprocessor of FIG. 9.
Figure 11:
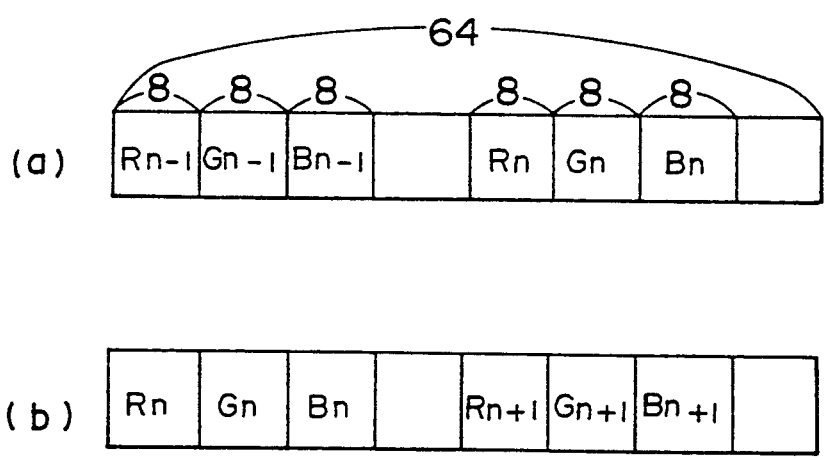
FIG. 11 is an explanation diagram showing the procedure of operation processing within the 3D unit of FIG. 10.

In this way, according to the embodiment, since each of the two FPUs is provided with a 3D unit and the data for two picture elements can be obtained simultaneously, the processing of one cycle is enough. In the microprocessor in the prior art, the processing of 3 cycles is necessary to get the data for two picture elements as above described. Comparing the quantity of hardware, the microprocessor due to the embodiment is increased by the two partitioned length adding and multiplying devices in comparison to that in the prior art as shown in FIG. 10, but it is not increased more than twice, as the temporary register 105 and the merger register 107 are not required to be duplicated. Therefore the microprocessor of the embodiment can improve the processing speed three times with the quantity of hardware not more than two times in comparison to that in the prior art.

Also in the microprocessor of the embodiment, the floating point processing section is provided with a multiplication function. That is, the partitioned length adding and multiplying devices 23 and 33 can carry out not only addition but also multiplication. Therefore, texture mapping processing can be carried out not by the integer processing section but by the floating point processing section.

Figure 6:
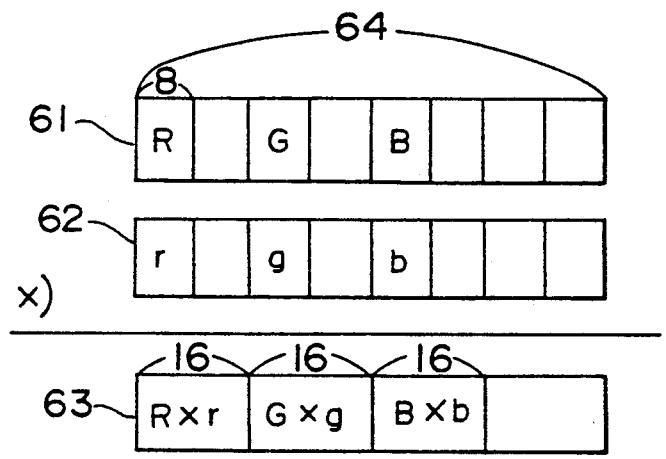
FIG. 6 is an explanation diagram showing a processing sequence and the number of bits in the case of carrying out texture mapping processing.
Figure 7:
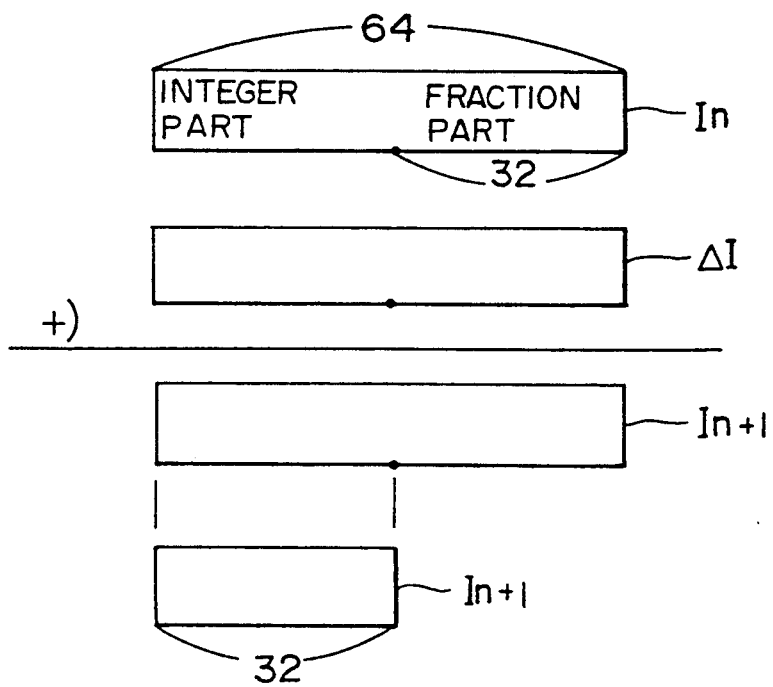
FIG. 7 is an explanation diagram showing the procedure of interpolation calculation and the number of bits in the case of carrying out glow shading processing.
Figure 8:
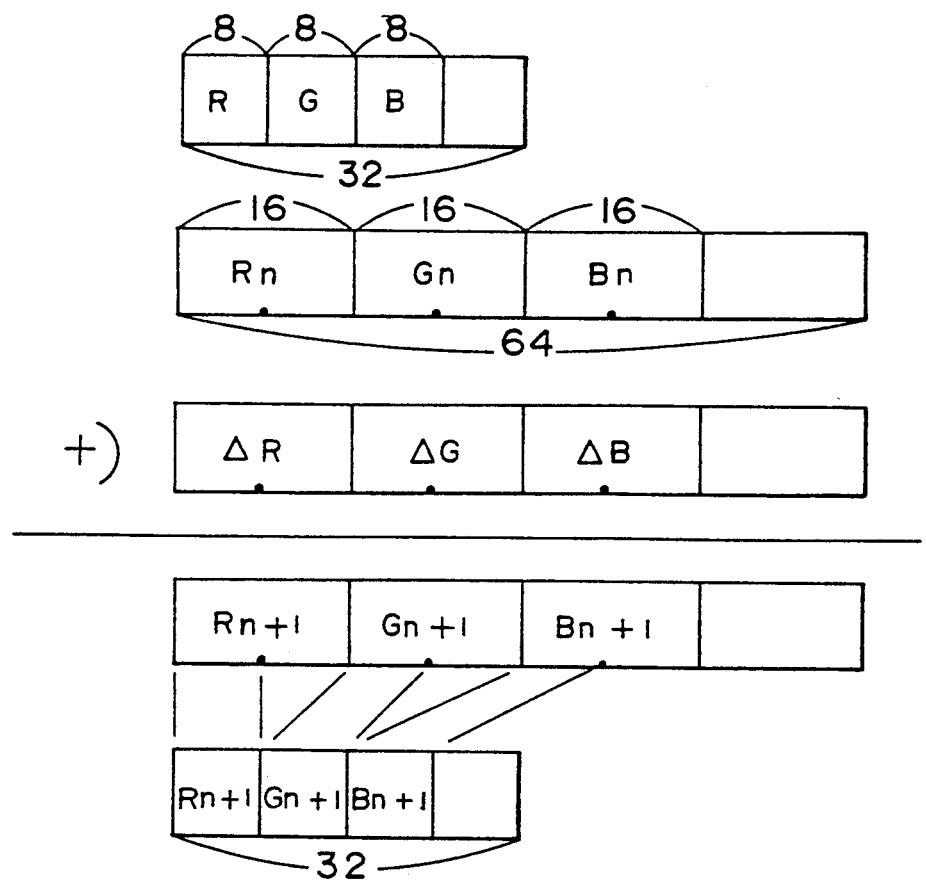
FIG. 8 is an explanation diagram showing the procedure of interpolation calculation and the number of bits for getting color information.
Figure 9:
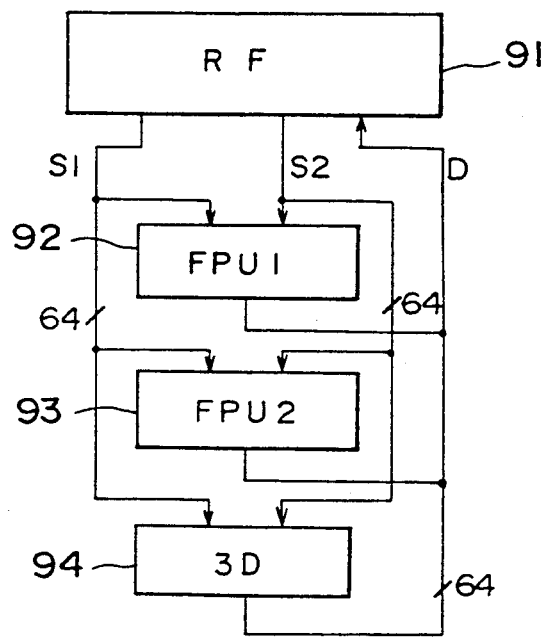
FIG. 9 is a block diagram showing the constitution of a floating point processing section of a microprocessor in the prior art.

As shown in FIG. 6, color information (R, G, B) 61 at the point n possessed by the objects themselves and color information (r, g, b) 62 possessed by figures to be affixed are read out from the FRF 17 respectively and inputted to the partitioned length adding and multiplying device 23. Here, information of each color is composed of integer of an 8 bits. In the partitioned length adding and multiplying device 23, multiplication is carried out in each color and color information (Rxr, Gxg, Bxb) 63 at this point n is obtained. The color information has a length of 16 bits, as a result of multiplication of two data with 8 bits. The color information of 8 bits at an upper half among 16 bits is taken out and stored in the FRF 17.

As above described, in the microprocessor in the prior art, the floating point processing section is not provided with a multiplying function. Consequently, the texture mapping processing must be carried out at the integer processing section and about 33 cycles are required therefor. On the contrary, according to the embodiment, processing is possible at the floating point processing section, and moreover the information of the three colors is obtained by one multiplying processing and in the unified form as one body. Accordingly, pack processing as in the prior art is not necessary. For this reason, in the microprocessor of the embodiment, the processing is possible in about 4 cycles, and a speed improvement not less than 8 times in comparison to that in the prior art is attained.

The embodiment as above described is one example, and does not limit the present invention. For example, although the embodiment has two FPUs, three or more FPUs may be provided, and in this case, a fixed point processing unit (partitioned length adder) may be provided on the side of at least two FPUs among the three or more FPUs.

Further, in the embodiment, the partitioned length adding and multiplying device is provided with a multiplying function as a fixed point processing unit, but it is not always necessary.

What is claimed is:

1. A microprocessor comprising:
   an integer processing unit having the position of a decimal point fixed;
   first and second floating point processing units capable of execution simultaneously with said integer processing unit;
   a register file connected to said first and second floating point processing units;
   a first fixed point processing unit installed adjacent said first floating point processing unit for receiving data for the point n (n is an integer not less than 0) from said register file, for searching for data for the point n+1 by partitioned addition of an increment forwarding by one point, and for outputting searched data as first addition results;
   a second fixed point processing unit installed adjacent said second floating point processing unit for receiving data for the point n from said register file, for searching for data for the point n+2 by partitioned addition of an increment forwarding by two points, for outputting searched data as second addition results, and for storing the second addition results in said register file; and a first merger unit for receiving the first addition results and the second addition results being outputted, and for gathering outputting data of a bit length of each upper half as one data.

2. A microprocessor as set forth in claim 1, wherein at least one of said first and second fixed point processing units has a partitioned multiplying function, and partitioned multiplication of two upper half bit lengths of partitioned bit lengths of two data outputted from said register file is carried out, and multiplication results of the partitioned bit lengths are outputted.

3. A microprocessor as set forth in claim 1, wherein:

said first fixed point processing unit includes a first pipeline register connected to an output end of said register file for holding data outputted from said register file;

a first partitioned length multiplier connected to an output end of said first pipeline register for receiving the data held in said first pipeline register, for carrying out partitioned multiplication, and for outputting first multiplication results; and a second pipeline register for receiving the first multiplication results being outputted, and for holding the first multiplication results and then outputting the first multiplication results to an input end of said register file;

said second fixed point processing unit includes a third pipeline register connected to an output end of said register file for holding data outputted from said register file;

a second partitioned length multiplier connected to an output end of said third pipeline register for receiving data held in said third pipeline register, for carrying out partitioned multiplication, and for outputting second multiplication results;

a second merger unit for receiving the first multiplication results from said first partitioned length multiplier and the second multiplication results outputted from said second partitioned length multiplier, and for taking out and unifying integer parts of the first and second multiplication results and outputting the integer parts of the first and second multiplication results as one data; and a fourth pipeline register for receiving the data outputted from said second merger unit, and for holding the data and then outputting the data to an input end of said register file.

* * * * *